(No Model.)
L. T. McKAY.
COTTON CHOPPER.
No. 586,140.  Patented July 13, 1897.
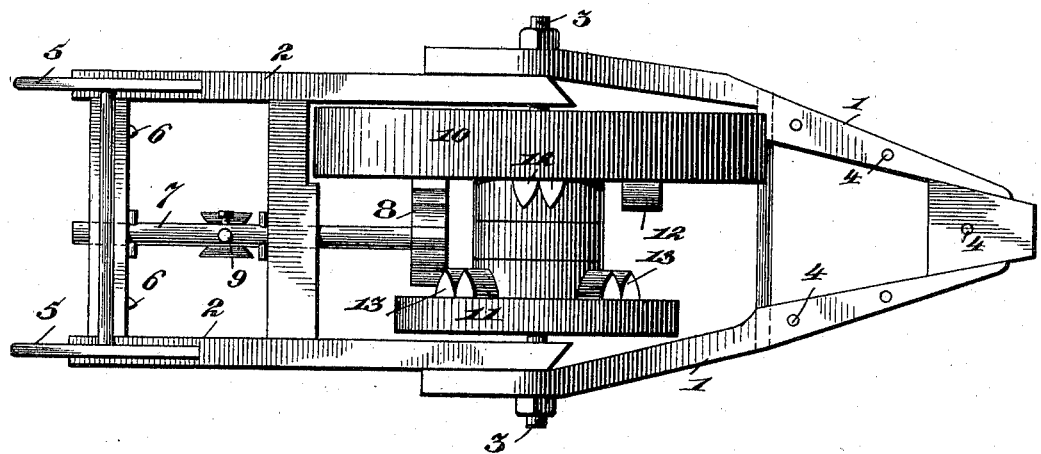
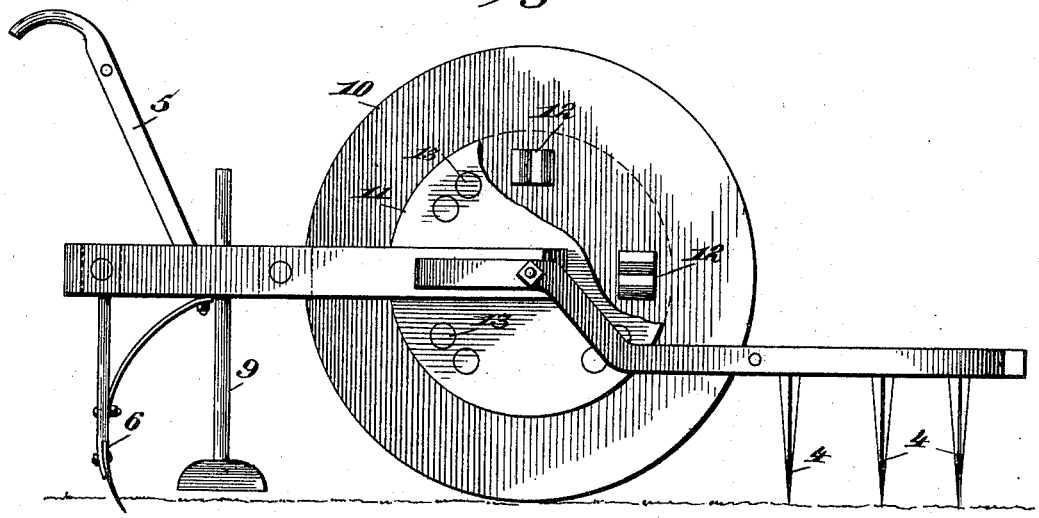
Witnesses
H. T. Dieterich
V. B. Hillyard
Inventor
Levy T. McKay
By his Attorneys,
C. A. Snow & Co.

UNITED STATES PATENT OFFICE.

LEVY T. McKAY, OF BARNESVILLE, ALABAMA.

COTTON-CHOPPER.

SPECIFICATION forming part of Letters Patent No. 586,140, dated July 13, 1897.

Application filed April 6, 1897. Serial No. 630,995. (No model.)

*To all whom it may concern:*

Be it known that I, LEVY T. McKAY, a citizen of the United States, residing at Barnesville, in the county of Marion and State of Alabama, have invented a new and useful Cotton-Chopper, of which the following is a specification.

This invention relates to agricultural implements of the kind especially designed for cultivating and thinning rows of plants at one operation, and has for its objects to improve this class of machines and increase their effectiveness and usefulness.

With these and other objects in view the invention consists of the novel features and details of construction which hereinafter will be more particularly set forth, illustrated, and finally claimed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a combined cotton chopper and cultivator constructed in accordance with this invention. Fig. 2 is a side elevation thereof, parts being broken away.

Corresponding and like parts are referred to in the following description and indicated in both views of the drawings by the same reference-characters.

The implement comprises a front frame 1, of approximately A form, and a rear frame 2, loosely mounted at their inner ends upon an axle 3, whereby each has an independent movement to adapt itself to the roll of the ground. The draft is applied to the front frame, and the latter is provided with harrow-teeth 4, and in order that the latter may be as short as possible the side bars of the frame have their rear portions deflected upwardly and rearwardly, whereby the front portion of the frame runs close to the surface of the ground.

The rear frame supports the chopping mechanism and is supplied with handles 5 for steering the implement and raising and lowering the hoe-blade, as may be required. Cultivator-shovels 6 are applied to the rear crossbar of the frame 2 for cutting down weeds and loosening the soil simultaneously with the thinning operation. A longitudinal shaft 7 is journaled in cross-bars connecting the side bars of the frame 2 and is provided at its front end with a pinion 8 and intermediate of its ends with a stem 9, having a hoe or chopping blade at its lower end, said stem having adjustable connection with the shaft to admit of the chopping or hoe blade being relatively raised or lowered.

The axle 3 pivotally connects the overlapping ends of the front and rear frame-bars and supports a ground-wheel 10 and a companion wheel 11, the two wheels being spaced apart and connected so as to rotate in unison. The ground-wheel is provided on its inner side at intervals with cogs 12, which are disposed in a circle and located so as to engage with the teeth of the pinion 8. The companion wheel 11 is provided on its inner side with cogs 13 for a like purpose to the cogs 12, and which are spaced apart and are arranged so as to come opposite the spaces between the cogs 12. By this disposition of the two sets of cogs 12 and 13 they alternately come into play and engage with the pinion 8 and effect a rocking or oscillatory movement of the shaft 7, whereby the stem carrying the chopping or hoe blade is vibrated across the line or row of plants being thinned, thereby performing the work effectively and preventing the accumulation of trash upon the hoe-blade and around the stem, which is an objectionable feature in cotton-choppers in which the hoe-blade receives a rotary movement continuously in the same direction.

For special work the harrow-teeth 4 may be replaced by cultivator-shovels, as common in implements of this character, the style of the cultivator shovels or teeth depending upon the character of work and condition of soil, but for general use the harrow-teeth will be retained and precede the hoe-blade and cultivator-shovels 6, as illustrated.

Having thus described the invention, what is claimed as new is—

1. In combination, front and rear frames, an axle pivotally connecting the frames at their inner ends and admitting of each having an independent movement, a ground and a companion wheel mounted upon the axle so as to rotate together and spaced apart, and provided on their inner faces with alternately-arranged cogs, a longitudinal shaft bearing a hoe or chopping blade and journaled to one of the said frames, and a pinion secured to the said shaft and extending into the space between the ground and companion wheels and alternately engaged by the aforesaid cogs, whereby the hoe-blade is oscillated, substantially as and for the purpose set forth.

2. In combination, a front frame having the rear portion of its side bars deflected upwardly and rearwardly, and bearing harrow-teeth, a rear frame bearing cultivator-shovels, an axle pivotally connecting the overlapping ends of the front and rear frames, a ground and a companion wheel mounted upon the axle so as to rotate together and provided on their inner sides with alternately-disposed cogs, a longitudinal shaft journaled to the rear frame and bearing a hoe-blade, and a pinion secured to the said shaft and alternately engaged by the aforesaid cogs, substantially as and for the purpose set forth.

In testimony that I claim the foregoing as my own I have hereto affixed my signature in the presence of two witnesses.

LEVY T. McKAY.

Witnesses:
JAMES T. CLARK,
J. T. STUCKEY.